(12) United States Patent
Morris et al.

(10) Patent No.: US 11,016,752 B1
(45) Date of Patent: May 25, 2021

(54) APPLICATION HEALTHCHECK COMMUNICATOR

(71) Applicant: Wells Fargo Bank, N.A., San Francisco, CA (US)

(72) Inventors: Theresa K. Morris, Charlotte, NC (US); Kay Jacintha Venkatrajan, Phoenix, AZ (US); Brian M. Wetherell, Shelby, NC (US); William M. Douglas, Kentwood, MI (US); Andrea Marie Simpson, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 16/527,133

(22) Filed: Jul. 31, 2019

Related U.S. Application Data

(63) Continuation of application No. 15/132,750, filed on Apr. 19, 2016, now Pat. No. 10,409,579.

(51) Int. Cl.
| | |
|---|---|
| *G06F 8/65* | (2018.01) |
| *H04L 29/08* | (2006.01) |
| *H04L 12/18* | (2006.01) |
| *H04L 12/26* | (2006.01) |

(52) U.S. Cl.
CPC ............... *G06F 8/65* (2013.01); *H04L 12/18* (2013.01); *H04L 43/10* (2013.01); *H04L 67/26* (2013.01); *H04L 67/34* (2013.01)

(58) Field of Classification Search
CPC ........ G06F 8/65; G06F 11/30; G06F 11/3003; G06F 11/3006; G06F 11/301; G06F 11/302; G06F 11/3055; G06F 11/3058; G06F 11/3065; G06F 11/3072; G06F 11/3079; G06F 11/3082; H04L 12/18; H04L 43/10; H04L 67/26; H04L 67/34
USPC ....................................................... 717/172
See application file for complete search history.

(56) References Cited

U.S. PATENT DOCUMENTS

| | | |
|---|---|---|
| 6,353,926 B1 | 3/2002 | Parthesarathy et al. |
| 6,751,657 B1 | 6/2004 | Zothner |
| 6,813,733 B1 | 11/2004 | Li et al. |
| 7,555,776 B1 | 6/2009 | Lymer et al. |
| 7,853,959 B2 | 12/2010 | Agassi et al. |
| 7,913,182 B2 | 3/2011 | Bear et al. |
| 7,925,635 B1 | 4/2011 | Ravulur et al. |
| 8,589,727 B1 | 11/2013 | Fletcher et al. |
| 8,693,981 B1 | 4/2014 | Anugu |
| 8,966,039 B1 * | 2/2015 | Fultz ....................... H04L 67/16 709/223 |

(Continued)

*Primary Examiner* — Andrew M. Lyons
(74) *Attorney, Agent, or Firm* — Walter Haverfield LLP; James J. Pingor

(57) ABSTRACT

Systems and methods that facilitate notifying users when applications have changed health status from operational to inoperational status or impaired operational status are disclosed herein. The application healthcheck communicator system can receive push notifications from one or more application wrappers or applications regarding the operational status of the application, and then the application healthcheck communicator can forward the application statuses to client device associated with selected end users. The application healthcheck communicator can select which users to send the status updates to based on subscription lists or active directories that the end users are associated with.

20 Claims, 11 Drawing Sheets

(56) References Cited

U.S. PATENT DOCUMENTS

| | | | |
|---|---|---|---|
| 9,021,314 B1* | 4/2015 | Sorenson, III | H04L 43/16 |
| | | | 714/47.2 |
| 9,223,672 B1* | 12/2015 | Honton | G06Q 10/101 |
| 9,891,907 B2* | 2/2018 | Searle | H04L 41/082 |
| 9,985,847 B2 | 5/2018 | Tung et al. | |
| 10,135,939 B2 | 11/2018 | Zhao et al. | |
| 10,182,147 B2* | 1/2019 | Lawson | H04L 63/10 |
| 2003/0225883 A1 | 12/2003 | Greaves et al. | |
| 2004/0010586 A1 | 1/2004 | Burton et al. | |
| 2004/0068481 A1 | 4/2004 | Seshadri et al. | |
| 2004/0267898 A1 | 12/2004 | Parkyn | |
| 2005/0038772 A1 | 2/2005 | Colrain | |
| 2006/0136583 A1 | 6/2006 | Helmstetter et al. | |
| 2006/0248181 A1* | 11/2006 | Glassco | H04L 67/322 |
| | | | 709/223 |
| 2007/0280135 A1 | 12/2007 | Syed et al. | |
| 2008/0046142 A1 | 2/2008 | Jordan et al. | |
| 2009/0006884 A1 | 1/2009 | Cahill et al. | |
| 2010/0075751 A1 | 3/2010 | Garvey et al. | |
| 2010/0146057 A1 | 6/2010 | Abu-Hakima et al. | |
| 2010/0185901 A1 | 7/2010 | Hirsch | |
| 2010/0191831 A1 | 7/2010 | Moon et al. | |
| 2010/0192020 A1 | 7/2010 | Van Riel et al. | |
| 2011/0200052 A1 | 8/2011 | Mungo et al. | |
| 2011/0276951 A1 | 11/2011 | Jain | |
| 2012/0226803 A1 | 9/2012 | Bharadwaj | |
| 2013/0007261 A1 | 1/2013 | Dutta et al. | |
| 2013/0254740 A1 | 9/2013 | Swaminathan et al. | |
| 2013/0297700 A1 | 11/2013 | Hayton et al. | |
| 2014/0136901 A1 | 5/2014 | Butler et al. | |
| 2014/0281744 A1 | 9/2014 | Elias et al. | |
| 2014/0289272 A1 | 9/2014 | Nahm | |
| 2014/0331225 A1 | 11/2014 | Helander et al. | |
| 2015/0025960 A1* | 1/2015 | Gadamsetty | G06F 3/0482 |
| | | | 705/14.44 |
| 2015/0095456 A1 | 4/2015 | Shah et al. | |
| 2015/0127804 A1 | 5/2015 | Kripalani et al. | |
| 2015/0128152 A1 | 5/2015 | Lachaume | |
| 2015/0188871 A1 | 7/2015 | Lewis et al. | |
| 2015/0378725 A1* | 12/2015 | Eberlein | H04L 67/42 |
| | | | 717/120 |
| 2016/0103750 A1* | 4/2016 | Cooper | G06F 11/3006 |
| | | | 719/328 |
| 2016/0179589 A1 | 6/2016 | Zhang | |
| 2016/0294800 A1 | 10/2016 | Oppenheim, Jr. et al. | |
| 2016/0308745 A1 | 10/2016 | Couture et al. | |
| 2017/0063845 A1 | 3/2017 | Sojoodi et al. | |
| 2017/0168881 A1* | 6/2017 | Memar-Zahedani | |
| | | | G06F 11/0709 |
| 2017/0192853 A1 | 7/2017 | Alberti et al. | |
| 2017/0244618 A1 | 8/2017 | Deluca et al. | |
| 2017/0244798 A1 | 8/2017 | Deluca et al. | |
| 2017/0262275 A1 | 9/2017 | Mohiuddin et al. | |

\* cited by examiner

500

| | Subscriber | Publisher | ApplicationAdmin | HealthCheckAdmin |
|---|---|---|---|---|
| | 502 | 504 | 506 | 508 |
| Broadcast | ReadOnly | ReadWrite | ReadWrite + Approve/Reject | ReadWrite + Approve/Reject |
| Subscribe | ReadWrite | ReadWrite | ReadWrite | ReadWrite + Manage Channel Access |
| AutoMonitoring Alerts | ReadOnly | ReadOnly | ReadOnly + Configure at application level | ReadOnly + Configure at application level |
| Add New Application | NoAccess | NoAccess | ReadOnly | ReadWrite |
| Manage Application | NoAccess | NoAccess | ReadWrite | ReadWrite |

| | Responsible | Closely | Intact | Errors | Ordinary | Indifferent |
|---|---|---|---|---|---|---|
| Informational | Alert | Popup | Post | Post | Post | None |
| Online (Returning) | Alert | Alert | Popup | Popup | Post | None |
| Maintenance | Alert | Alert | Popup | Popup | Post | None |
| Trouble | Alert | Alert | Popup | Popup | Post | None |
| Impaired | Alert | Alert | Popup | Popup | Post | None |
| Authenticated | | | | | | |
| Online (Returning) | Alert | None | None | None | None | None |
| Impaired | Alert | Alert | Popup | Post | Post | None |
| Offline | Alert | Alert | Popup | Post | Post | None |
| Maintenance | Alert | Alert | Popup | Post | Post | None |

APPLICATION HEALTHCHECK COMMUNICATOR

CROSS-REFERENCE TO RELATED APPLICATIONS

This application is a continuation of U.S. patent application Ser. No. 15/132,750, entitled "APPLICATION HEALTHCHECK COMMUNICATOR," and filed Apr. 19, 2016, the entirety of which is incorporated herein by reference.

BACKGROUND

In large enterprise environments, end users can use many different applications and services that need to be monitored and maintained. From time to time, applications may become impaired, or nonfunctioning, based on both planned, and unplanned outages. Currently, in order to keep end users abreast of the functionality of applications, emails and other notification can be sent to users or groups of users regarding the functionality of the applications and services. This can be complicated from the perspective of the end user, trying to keep track of various notifications. Similarly, it can be challenging from the perspective of the IT maintenance personnel by having to send out multiple notifications and alerts, and ensuring that the correct users are notified.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Systems and methods that facilitate notifying users when applications have changed health status from operational to inoperational status or impaired operational status are disclosed herein. The application healthcheck communicator system can receive push notifications from one or more application wrappers or applications regarding the operational status of the application, and then the application healthcheck communicator can forward the application statuses to client device associated with selected end users. The application healthcheck communicator can select which users to send the status updates to based on subscription lists or active directories that the end users are associated with.

In an embodiment, the application healthcheck communicator can determine if the application is inoperational or impaired based on the length of time that the application healthcheck communicator has not heard from the applications. In another embodiment, the application healthcheck communicator can ping the applications, and based on the response rate or ping time, the application healthcheck communicator can determine whether or not the application is inoperable or impaired.

In another embodiment, the application healthcheck communicator can facilitate the publishing of manual alerts by maintenance users. These alerts and other, autogenerated alerts, can alert users about when applications are inoperational, or scheduled to be inoperational for scheduled maintenance or emergency maintenance. In an embodiment, the notifications can be received by the client devices and be viewed in a system tray or application interface on the client device. Depending on the subscription type, active directory type, or alert type, the notifications and/or updates can alert users in different ways. Some alerts may include pop-up notifications, sounds, or other alerts. Other notifications may passively update within the client application or system tray without audible or visual alerts.

For these considerations, as well as other considerations, in one or more embodiments, a system can include a memory to store computer-executable instructions and a processor, coupled to the memory, to facilitate execution of the computer-executable instructions to perform operations. The operations can include receiving an application update comprising an operational status of an application. The operations can also include selecting a user account from a set of user accounts based on user subscription data and the application. The operations can also include broadcasting, over an internet protocol network, the application update to a client device associated with the user account.

In another embodiment, a method for receiving, by a device comprising a processor, an application status update comprising an operational status of an application and selecting, by the device, a set of users to send the application status update based user account data associated with the set of users and an application type. The method can also include transmitting, by the device, over an internet protocol network, the application status update to a set of client devices associated with the set of users.

In another embodiment, a non-transitory computer-readable medium configured to store instructions, that when executed by a processor perform operations including, pinging an application to check the status of the application. The operations can also include determining that the application is nonfunctional in response to not receiving a ping response in a predetermined period of time. The operations can also include selecting a user account from a set of user accounts to send an application update based on user subscription data and the application. The operations can also include transmitting, over an internet protocol network, the application update to a client device associated with the user account.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 5 is an illustration of an example chart showing access privileges for various users in the application healthcheck communicator system in accordance with one or more aspects of the disclosure.

FIG. 6 is an illustration of an example chart showing notification types for various application updates in accordance with one or more aspects of the disclosure.

DETAILED DESCRIPTION

Figure 1:
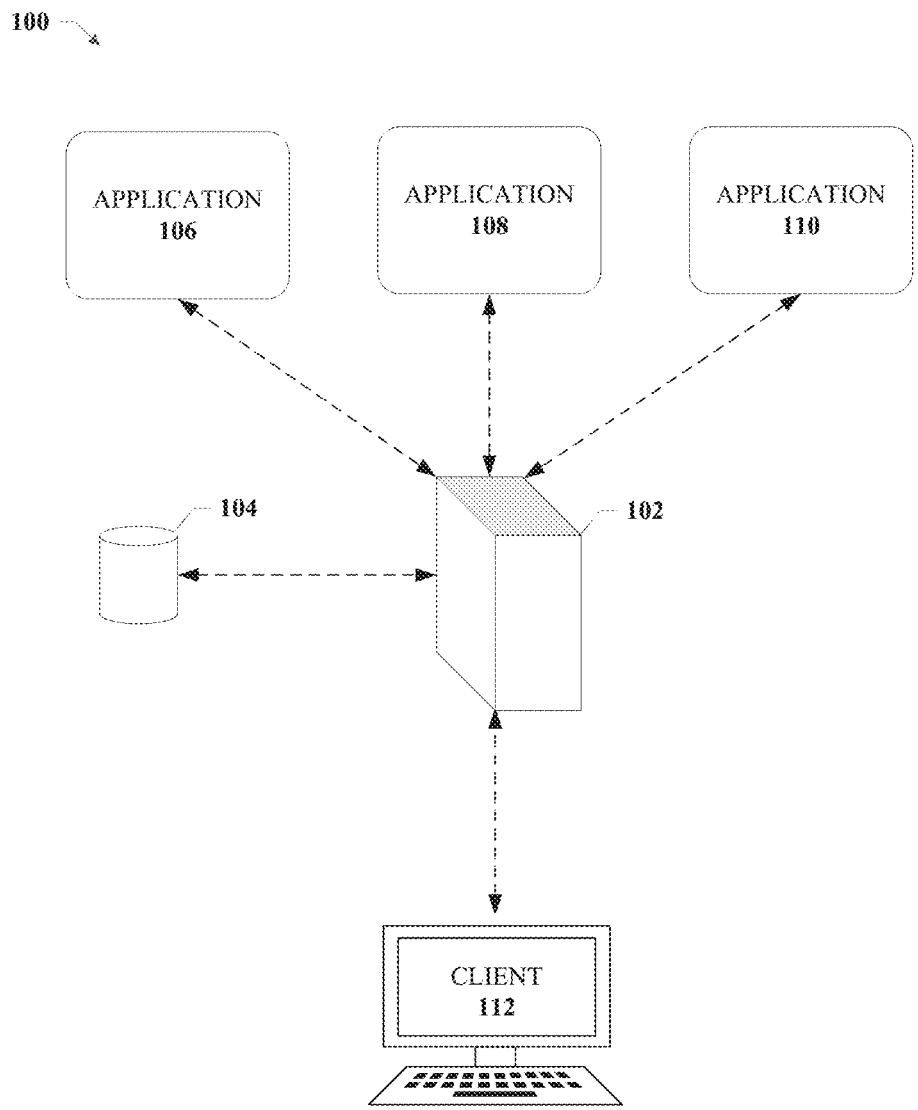
FIG. 1 is an illustration of an example system for receiving and broadcasting application updates in accordance with one or more aspects of the disclosure.

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

FIG. 1 illustrates an example system 100 for receiving and broadcasting application updates in accordance with one or more aspects of the disclosure. In system 100, an application healthcheck communicator 102 can receive application updates from applications 106, 108, and 110 and communicate those application updates to one or more devices (e.g., client device 112). Application healthcheck communicator 102 can receive subscription information related to the applications from a database 104.

In an embodiment, application healthcheck communicator 102 can receive an application update comprising an operational status of an application (e.g., application 106). Application healthcheck communicator 102 can then select a user account from a set of user accounts (e.g., user account associated with client device 112) based on user subscription data (from database 104) and the application 106. Application healthcheck communicator 102 can then broadcast, over an internet protocol network, the application update to a client device (e.g., client device 112) associated with the user account.

In an embodiment, application healthcheck communicator 102 can select which of the updates from applications 106, 108, and 110 to send to client device 112. In some embodiments, client device 112 may belong to an active directory service (session manager in other network services) or be subscribed to notifications from applications 106 and 108 (or other combinations thereof). Therefore, application healthcheck communicator 102 can determine which applications client device 112 is to receive updates for (based in part on subscription data in database 104) and send those updates to client device 112. In some embodiments, a user associated with client device can subscribe to one or more of the applications 106, 108, or 110, and in other embodiments, client device 112 may belong to an active directory (e.g., a proprietary directory service that provides centralized domain management which authenticates and authorizes computers in a domain type network, assigning and enforcing security and access policies), and client device 112 can receive updates from application associated with the active directory. In an embodiment, the client device 112 can be enrolled in one or more active directories or subscription lists based on the job duties of the user associated with client device 112 or based on the department in which the user works. In other embodiments the subscriptions lists can be based on which applications are used, regularly or infrequently, by client device 112.

Client device 112 can display the notifications in a variety of ways. In an embodiment, client device 112 can include a system tray notification that can display a stream of application updates, or can display a list of applications and their health, by either graphical representation or textual representation. In an embodiment, as new updates are received, the client device 112 can display pop-up notifications or play audible sounds to alert users to the updates. The types of notifications can be determined based on user settings, and can include certain types of notifications for certain applications, certain types of updates (impaired, inoperational, etc). In other embodiments, maintenance users or system admins can determine which type of notifications are to be set for each application or application update type. In an embodiment, client device 112 can be a desktop computer, laptop, mobile device, terminal computer, vehicle computer, or any networked computing device that is operable to send, receive, and/or display notifications.

In an embodiment, application healthcheck communicator 102 can ping, or send an update request to one or more of applications 106, 108, and 110. Application healthcheck communicator 102 can send the request at regular intervals and based on the replies or lack of replies, determine that one of the applications is inoperational or impaired. For instance, application healthcheck communicator 102 can determine that application 106 is impaired or inoperational after missing a predetermined number of pings, or missing pings for a predetermined length of time. In other embodiments, application healthcheck communicator 102 can receive updates at regular intervals from applications 106, 108, and 110, and after a predetermined time period of missed updates, determine that the application is inoperational or impaired.

In an embodiment, after determining that application 106 (by way of example) is impaired, application healthcheck communicator 102 can delay broadcasting the update to client device 112. Application healthcheck communicator 102 can delay for a predetermined time period (e.g., 5 minutes, 15 minutes, etc.) in order to give maintenance users or system admins a chance to correct the error. These time period delays can be based on the type of application, the type of status update, or based on requests from the system admin or maintenance user.

In an embodiment, application healthcheck communicator 102 can receive an update that one or more of applications 106, 108, or 110 will be undergoing scheduled and/or otherwise planned maintenance, and send a notification to client device 112. The notification to client device 112 can be sent when the application undergoes maintenance, or at some predetermined time period prior to undergoing maintenance.

In an embodiment, the application update can indicate whether the entire application is inoperational or impaired, or whether a particular service, or portion of the application is inoperational or impaired. For instance, if an application is associated with a plurality of servers, and one or more of the servers goes down or becomes non-functional, the application may still be operational, but with fewer features or bandwidth than before. The application status update received from the application can indicate the overall health of the application, and the application healthcheck communicator 102 can send that status update to the client device 112.

Figure 2:
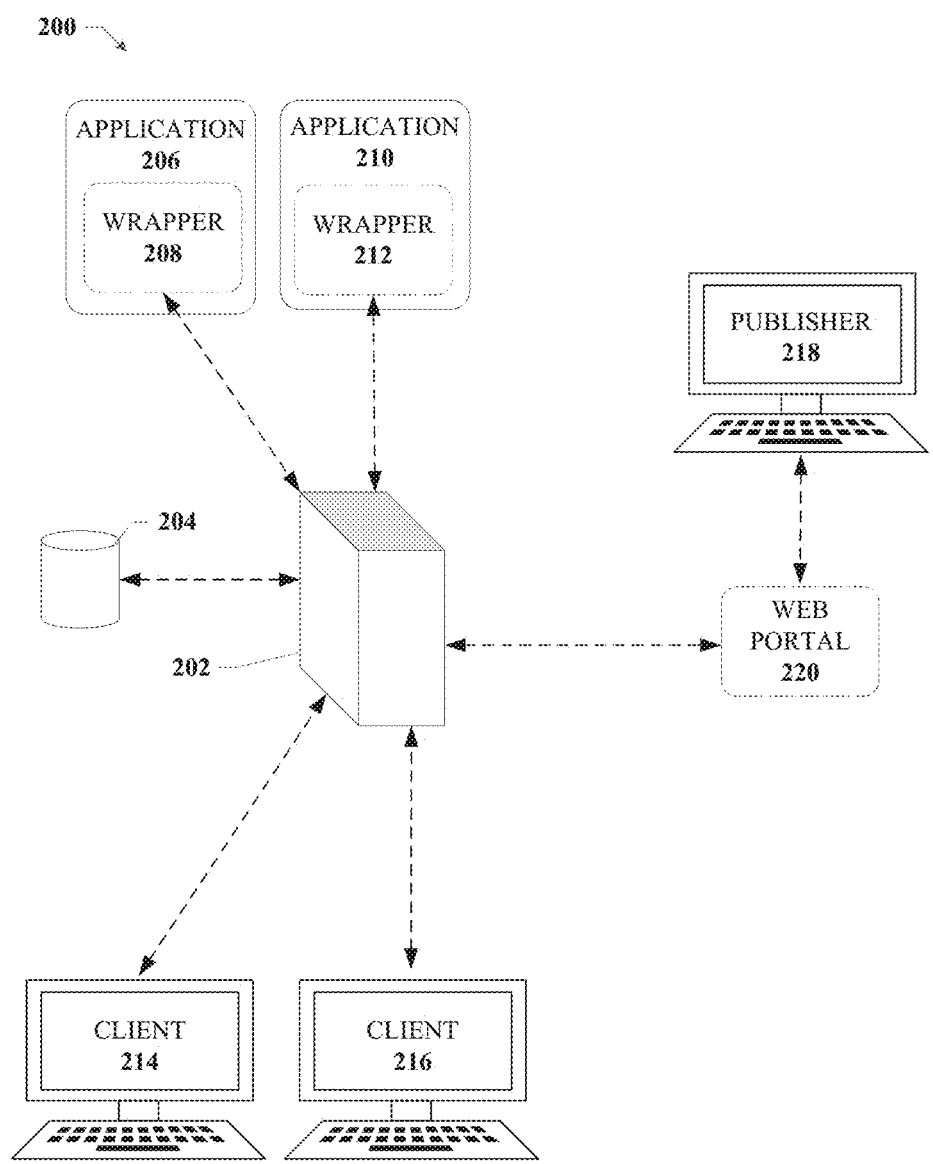
FIG. 2 is an illustration of an example system for receiving and broadcasting application updates in accordance with one or more aspects of the disclosure.

Turning now to FIG. 2, illustrated is an example system 200 for receiving and broadcasting application updates in accordance with one or more aspects of the disclosure. In system 200, an application healthcheck communicator 202 can receive application updates from applications 206 and 210, and communicate those application updates to one or more client devices 214 and 216. In an embodiment, application healthcheck communicator 202 can receive the application updates from applications 206 and 210 via application wrappers/validators 208 and 212 respectively. Application wrapper 208 and 212 can be a subroutine in the applications that are designed to call other subroutines or system calls with little additional computation and can handle external communications. Application healthcheck communicator 202 can receive subscription information related to the applications from a database 204.

In an embodiment, application healthcheck communicator 202 can receive an application update comprising an operational status of an application (e.g., application 206) via application wrapper 208. Application healthcheck communicator 202 can then select a user account from a set of user accounts (e.g., user accounts associated with client devices 214 or 216) based on user subscription data (from database 204) and the application 206. Application healthcheck communicator 202 can then broadcast, over an internet protocol network, the application update to one or more of client devices 214 or 216.

In another embodiment, application healthcheck communicator 202 can receive the application status update from a publisher device 218. The publisher device 218 can be associated with a maintenance user or system administrator. In an embodiment, the publisher device 218 can send the application status update to the application healthcheck communicator 202 via a web portal accessible by the publisher device 218, wherein the web portal 220 is connected to the application healthcheck communicator 202 via an internet protocol network.

In an embodiment, application healthcheck communicator 202 can select which of the updates from applications 206 and 210 to send to client devices 214 and 216. In some embodiments, one or more of client devices 214 and 216 may belong to an active directory or be subscribed to notifications from applications 206 and 210 (or other combinations thereof). Therefore, application healthcheck communicator 202 can determine which applications client devices 214 and 216 are to receive updates for (based in part on subscription data in database 204) and send those updates to client devices 214 and 216.

In an embodiment, after determining that either application 206 or 210 are impaired or inoperational, application healthcheck communicator 202 can delay broadcasting the updates to client devices 214 and 216. Application healthcheck communicator 202 can delay for a predetermined time period (e.g., 5 minutes, 15 minutes, etc.) in order to give maintenance users or system admins a chance to correct the error. These time period delays can be based on the type of application, the type of status update, or based on requests from the system admin or maintenance user. In other embodiments, publisher device 218 can send a delay instruction to application healthcheck communicator 202 to delay for a period of time in order to allow maintenance users or system administrators to repair or configure the applications 2016 and 210.

In an embodiment, the application update can indicate whether the entire application is inoperational or impaired, or whether a particular service, or portion of the application is inoperational or impaired. For instance, if an application is associated with a plurality of servers, and one or more of the servers goes down or becomes non-functional, the application may still be operational, but with fewer features or bandwidth than before. The application status update received from the application can indicate the overall health of the application, and the application healthcheck communicator 202 can send that status update to the client devices 214 and 216.

In an embodiment, the application healthcheck communicator 202 can send the application status updates from the applications 206 and 210 to the publisher device 218 before sending the application status updates to the client devices 214 and 216. Publisher device 218 can then approve transmission/broadcast of the application status updates to the client devices 214 or 216 or request a delay to try to repair the application 206 or 210.

In an embodiment, application healthcheck communicator 202 can employ a subscriber service (e.g., .Net Signal R technology) where updates go automatically to clients. Such a service could use Windows authentication to authorize active directories and requests for channel subscriptions. Client devices 214 and 216 can therefore receive messages based on the channels (application/environment) to which they are subscribed. System administrators can manage user role access where authorization is provided by the administrator groups defined for the user roles as configured in the database 204.

In an embodiment, the broadcasts to client devices 214 and 216 can be based on various thresholds set by subscription information, system admins, or by the application settings. If the application healthcheck communicator 202 fails to receive status updates for a predetermined time period, application healthcheck communicator 202 can determine that the application is down and send the status to the client devices. The predetermined time period can be variable however. Similarly, even if the application healthcheck communicator 202 receives a status update that indicates application 206 is down, the application healthcheck communicator 202 can wait to broadcast the update to the client devices 214 and 216 until a time period is met. In an embodiment, the time period can be based on the criticality of the application. If the application 206 is related to a mission-critical feature, then the threshold for communicating the status update can be shorter.

Figure 3:
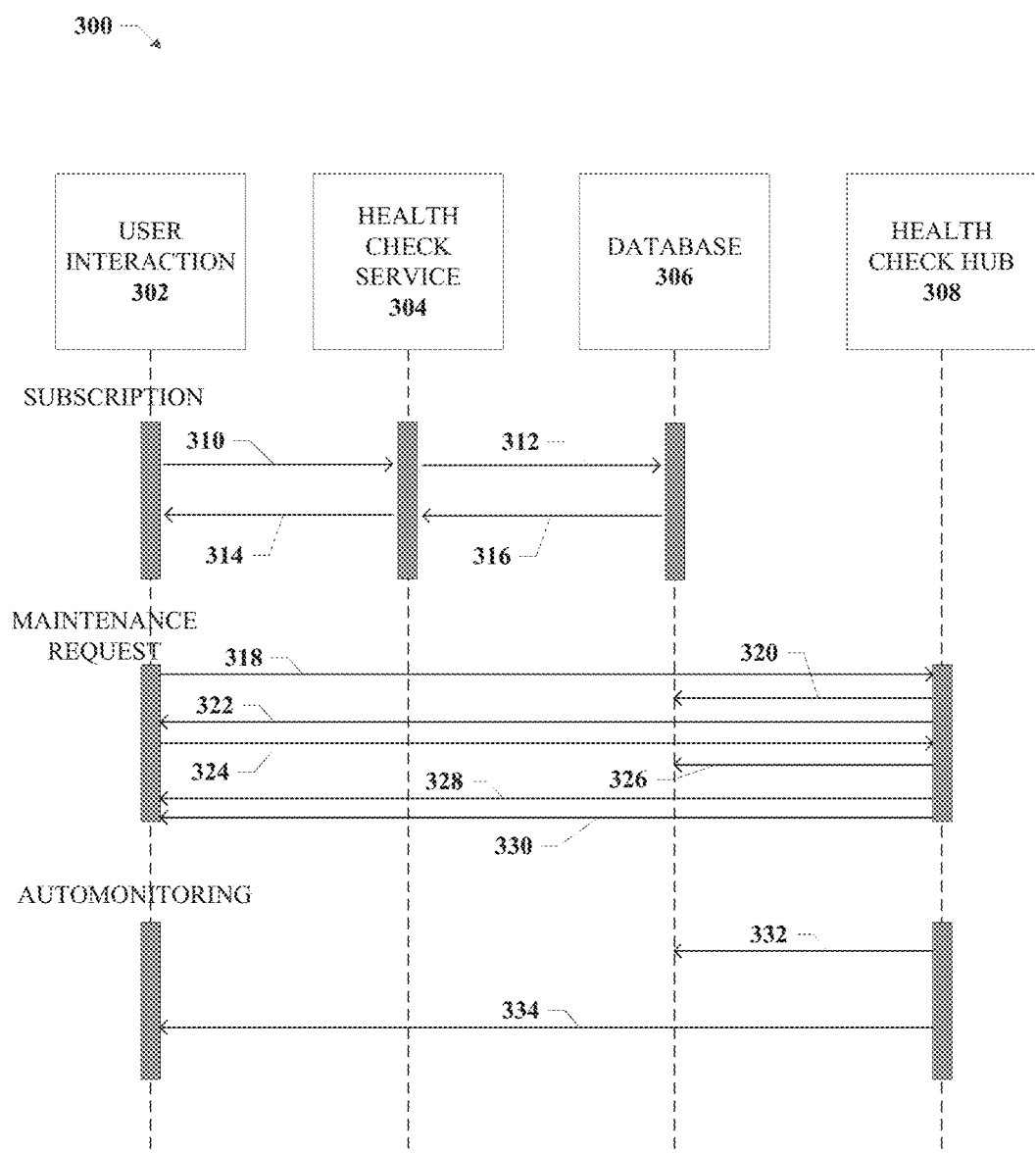
FIG. 3 is an illustration of an example flowchart for receiving and broadcasting application updates in accordance with one or more aspects of the disclosure.

Turning now to FIG. 3, illustrated is an example flowchart 300 for receiving and broadcasting application updates in accordance with one or more aspects of the disclosure.

Blocks 302, 304, 306, and 308 represent the actions of the user, health check communicator/service, database, and healthcheck hub respectively. At 310, the user 302 can send a subscription request to the health check service 304. The subscription request can be a request to join a channel to receive updates related to one or more applications. The subscriptions can be based on active directories or can otherwise be approved by a systems administrator to limit the number of client devices or users that are authorized to receive updates.

The health check service 304 can forward the subscription request to the database 306 which can either approve or deny the subscription request. The database can send the approval or denial 316 back to the health check service 304 which can forward it to the user 302 at 314. At 314, the health check service 304 registers the client device associated with the user in the channel so that the user receives all future updates.

At 318, the user interaction at 302 involves a user sending a maintenance request to the health check hub. At 320, the request persists with the database 306 and at 322, the request is broadcast to the system administrators. At 324, the administrators can approve the request, which is then logged in the database at 326.

At 328, the health check hub 308 can send the specific user that made the request a notification of either acceptance or rejection by the administrator, and at 330 the health check hub 308 can send an application update at the specified time interval.

During the automonitoring phase, when the health check hub is monitoring the health of the application, at 332 the health check hub 308 can log the status with the database and then at 334 can broadcast the updates to the subscribed clients.

Figure 4:
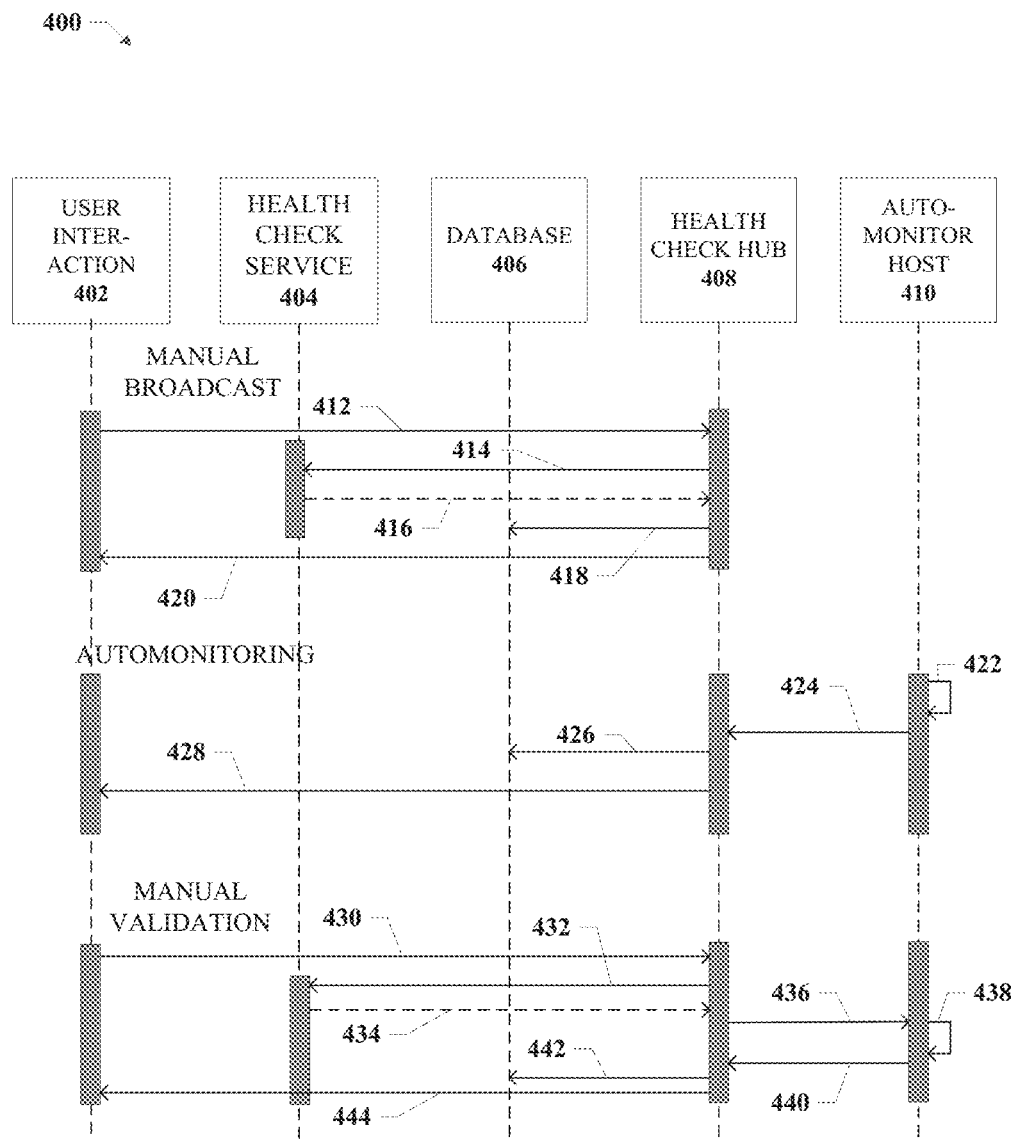
FIG. 4 is an illustration of another example flowchart for receiving and broadcasting application updates in accordance with one or more aspects of the disclosure.

Turning now to FIG. 4, illustrated is another example flowchart for receiving and broadcasting application updates in accordance with one or more aspects of the disclosure.

Blocks 402, 404, 406, 408, and 410 represent the actions of the user (e.g., a client interface), health check communicator/service, database, and healthcheck hub, and automonitor host respectively.

In manual broadcast mode, at 412, the user can construct a broadcast message for a channel using the client interface 402 and then send the broadcast message from the client interface to the healthcheck hub 408. At 414, the hub 408 validates the user permission with the health check service 404 which can send a validation confirmation at 416. At 418, the health check hub 408 can then save a record of the broadcast message with the database 406. At 420, the health check hub 408 can then broadcast the message to the client interface 402 assigned to users with a subscription to the broadcast message channel.

In automonitoring mode, at 422, the automonitor host 410 can automatically validate periodically performing checks on monitored components to ascertain operational status. At 424, the component operational status can be stored in the monitor host "status list" at the health check hub 408 and database 406 at 426. The monitor host 410 can periodically retrieve operation statuses for all validated components for a channel from a status list, and component statuses are used to construct broadcast messages and sent to the health check hub 408. At 428 the hub 408 can broadcast the messages to client interfaces 402 assigned to the users with a subscription to the broadcast message channel.

In manual validation mode, at 430, a user can send a validation request to a health check hub 408. At 432, the hub 408 can verify the user permission for manual validation using Healthcheck Service 404 and receive a notification of user permission at 434. At 436, the hub 408 can send a manual validation request to automonitor host 410, and at 438, all components monitored by validators are checked to ascertain operational status. At 440 and 442, component statuses are updated in the status list within the automonitor host 410 and database 406. Component statuses are used to construct broadcast messages and sent to hub 408 at 440, and at 444, the hub 408 broadcasts message to client interfaces 402 assigned to users with a subscription to the broadcast message channel.

Turning now to FIG. 5, illustrated is example chart 500 showing access privileges for various users in the application healthcheck communicator system in accordance with one or more aspects of the disclosure.

The database (e.g., database 104, 204, etc) can include a list of permissions for the users, whether subscribers 502 or publishers 504, application admins 506, and healthcheck admins 408 that provide device and system admins that provide information about what permissions each of the users have regarding the application updates.

By way of example, with regard to broadcast permissions, the subscriber 502 and publisher 504 can read broadcasts but not generate broadcasts, while application admins 506 and healthcheck admins 508 can both read and write, as well as approve or reject broadcasts. With regard to subscribe permissions, subscriber 502, publisher 504, and application admins 506 can read or write subscribing, while healthcheck admins 508 can read/write and manage the channel access.

With regard to automonitoring alerts, subscriber 502 and publisher 504 can read alerts, while application admin 506 and healthcheck admin 508 can read and configure at the application level. Subscriber 502 and publisher 504 have no access to adding or managing applications, while both application admin 506 and healthcheck admin 508 can have read/write permissions for managing applications, while application admins 506 can only read new applications, while healthcheck admins can have both read/write permissions for adding new applications.

Turning now to FIG. 6, illustrated is an example chart 600 showing notification types for various application updates in accordance with one or more aspects of the disclosure. Each subscriber can set various levels of interest (responsible 602, closely 604, interest 606, curious 608, ordinary 610, and indifferent 612 to various applications, while for each type of application update (informational, online, maintenance, trouble, impaired, etc.) there can be various notification types, e.g., alerts, popups, posts, etc. By way of example, if a subscriber was curious 608 about an application, any informational updates would just post to a feed, while online, maintenance, trouble, or impaired updates would induce a popup in the system tray in the client. By contrast, if somebody were responsible 602 for an application, each application update would result in an alert. Similarly, if somebody was indifferent 612, each application update would result in no alerts, popups, or posts. Automonitoring updates can have similar notification types based on the interest level each subscriber has in various applications.

Figure 7:
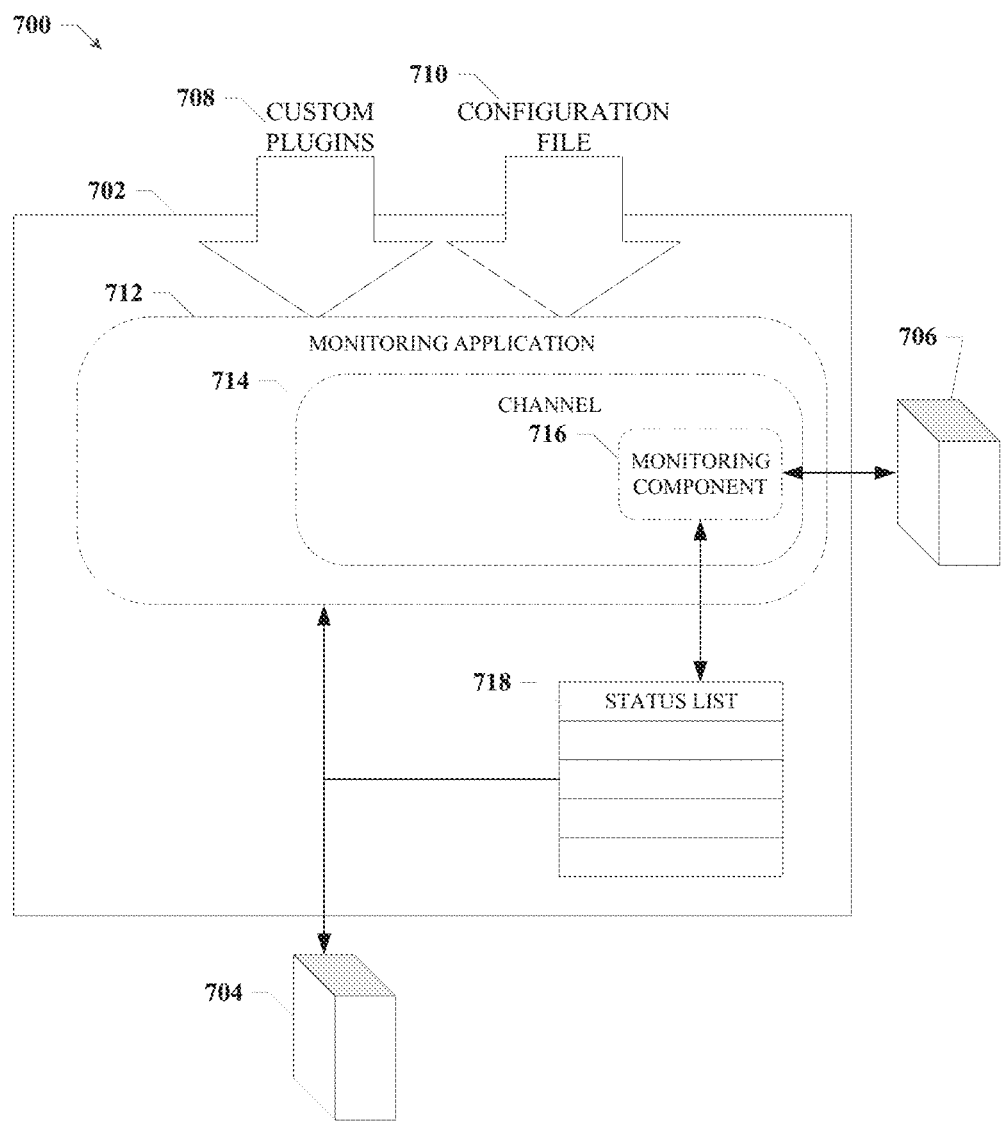
FIG. 7 is an illustration of an example automonitoring system for application updates in accordance with one or more aspects of the disclosure.

Turning now to FIG. 7, illustrated is an example automonitoring system 700 for application updates in accordance with one or more aspects of the disclosure. Each application channel can configure their automated monitoring validators. Validators can be defined as an individual item that validates a specific component of the application channel. Included validators are HTTP, DNS, WCF, Ping, Farm, Database, EventLog, Autosys, and other custom validators such as HTTPValidator, PingValidator, WCFValidator, dnsValidators, FarmValidators, DatabaseValidator, EventLogValidators, AutosysValidator, and CustomValidator. Each of the automated monitoring validators can be disabled at any time. When an application or channel is put into maintenance, it can be configured to allow the shutdown of automated monitoring validators.

In an embodiment, each application channel will have the ability to sub-configure the validators (how many pings, what constitutes failure, how many servers are down (as one down might be okay). For each validator, the number of failures can be configured to determine the state. For instance, the dnsValididator may be configured to allow 1 failure but not more than one. If the dsnValidator fails once, but the next try is successful, the system will still be considered all-okay. If it fails twice, then the monitoring will pick up that it is impaired or down depending on the state that is configured for the particular validator.

For each validator, when statuses come in, a rule will be set to automatically broadcast the health of the application or to broadcast to the responsible parties for the application. The validator will be configured to give a threshold of the amount of time between notifying the responsible parties and broadcasting the impairment or outage.

The automated monitoring is configured to have at minimum, but not limited to, three states: Success, Impaired, and Failure. For all validators configured, a timing is set to receive a response from the application/channel. The validator will update the host with the response. Application healthcheck communicator will log all incoming automated monitoring validator responses to which metrics can be utilized to determine behavior patterns. Application healthcheck communicator will allow configuration for each channel to identify patterns/models for predicting outages for each automated validator. By way of example, if a service fails after "n" number of pings of no response, application healthcheck communicator will identify a risk of an outage occurring.

For each channel: based on number of downtime, duration of downtime, number of affected users, application healthcheck communicator can calculate the risk factor. Use metrics to determine the number of applications down at the same time to identify "high risk" application behavior.

Turning to system 700, application healthcheck communicator 702 can monitor the statuses of an application 706 using a monitoring component 716. The monitoring component 716 checks all applications in a channel 716 in a monitoring application 712 within the healthcheck communicator 702. Custom plugins 708 and configuration file 710 can configure the settings, threshold, and etc., of monitoring application 712. Monitoring component 716 can keep a status list 718 of all the applications being monitored (application 706), and that status list can be communicated to client device 704. The status list 718 is the internally updated, and is the list of channels and components. The host application 712 can periodically retrieve statuses in the list and broadcast the status message to one or more client devices 704.

Figure 8:
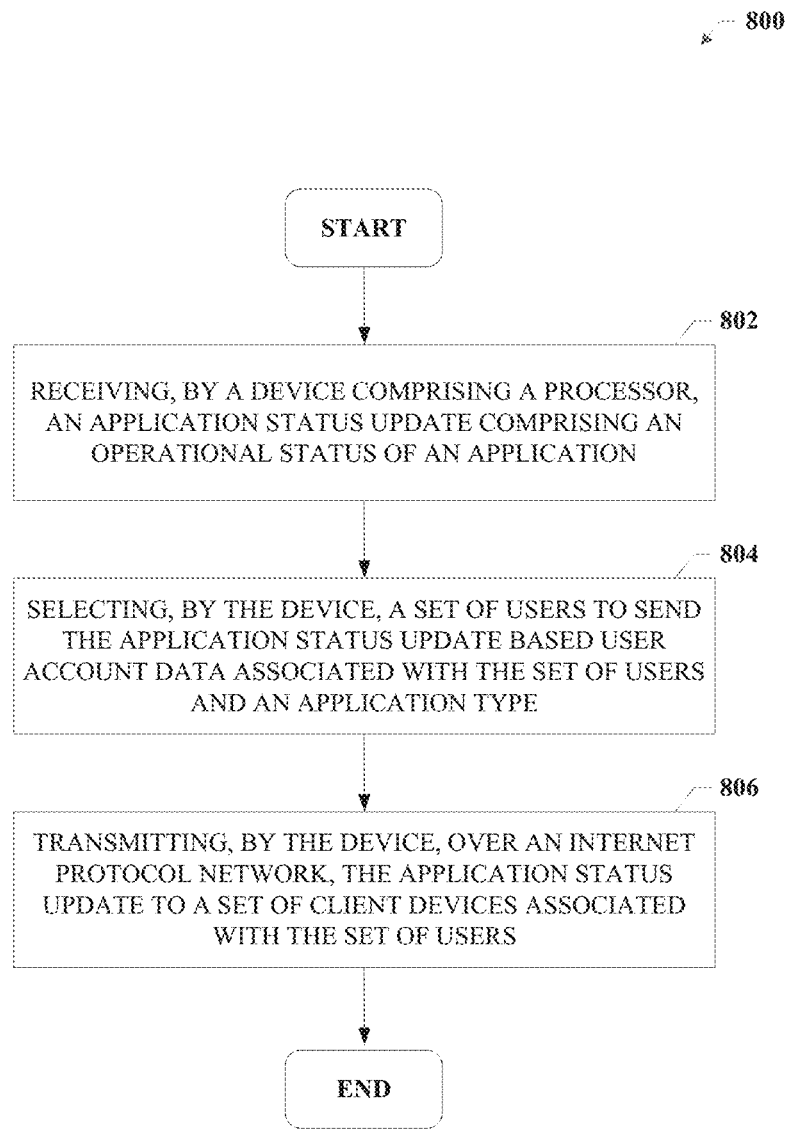
FIG. 8 is an illustration of an example flow chart of a method for receiving and broadcasting application updates, according to one or more embodiments.
Figure 9:
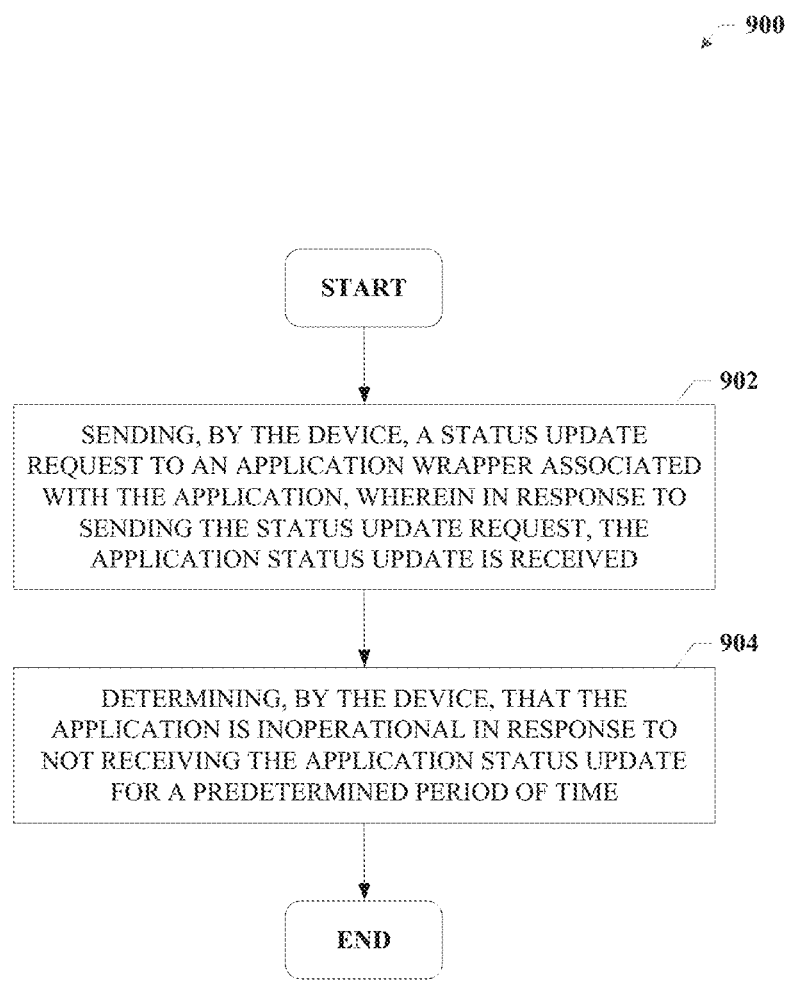
FIG. 9 is an illustration of an example flow chart of a method for receiving and broadcasting application updates, according to one or more embodiments.

FIGS. 8-9 illustrates a process in connection with the aforementioned systems. The process in FIGS. 8-9 can be implemented for example by systems and methods 100, 200, 300, 400, 500, 600, and 700 illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter Turning now to FIG. 8, illustrated is an example flow chart of a method 700 for receiving and broadcasting application updates, according to one or more embodiments. The method can start at 802, where the method includes receiving, by a device comprising a processor, an application status update comprising an operational status of an application. At 804, the method includes selecting, by the device, a set of users to send the application status update based user account data associated with the set of users and an application type. At 806, the method includes transmitting, by the device, over an internet protocol network, the application status update to a set of client devices associated with the set of users.

Turning now to FIG. 9, illustrated is a method 900 for receiving and broadcasting application updates, according to one or more embodiments. At 902 the method includes sending, by the device, a status update request to an application wrapper associated with the application, wherein in response to sending the status update request, the application status update is received. At 904 the method includes determining, by the device, that the application is inoperational in response to not receiving the application status update for a predetermined period of time.

Figure 10:
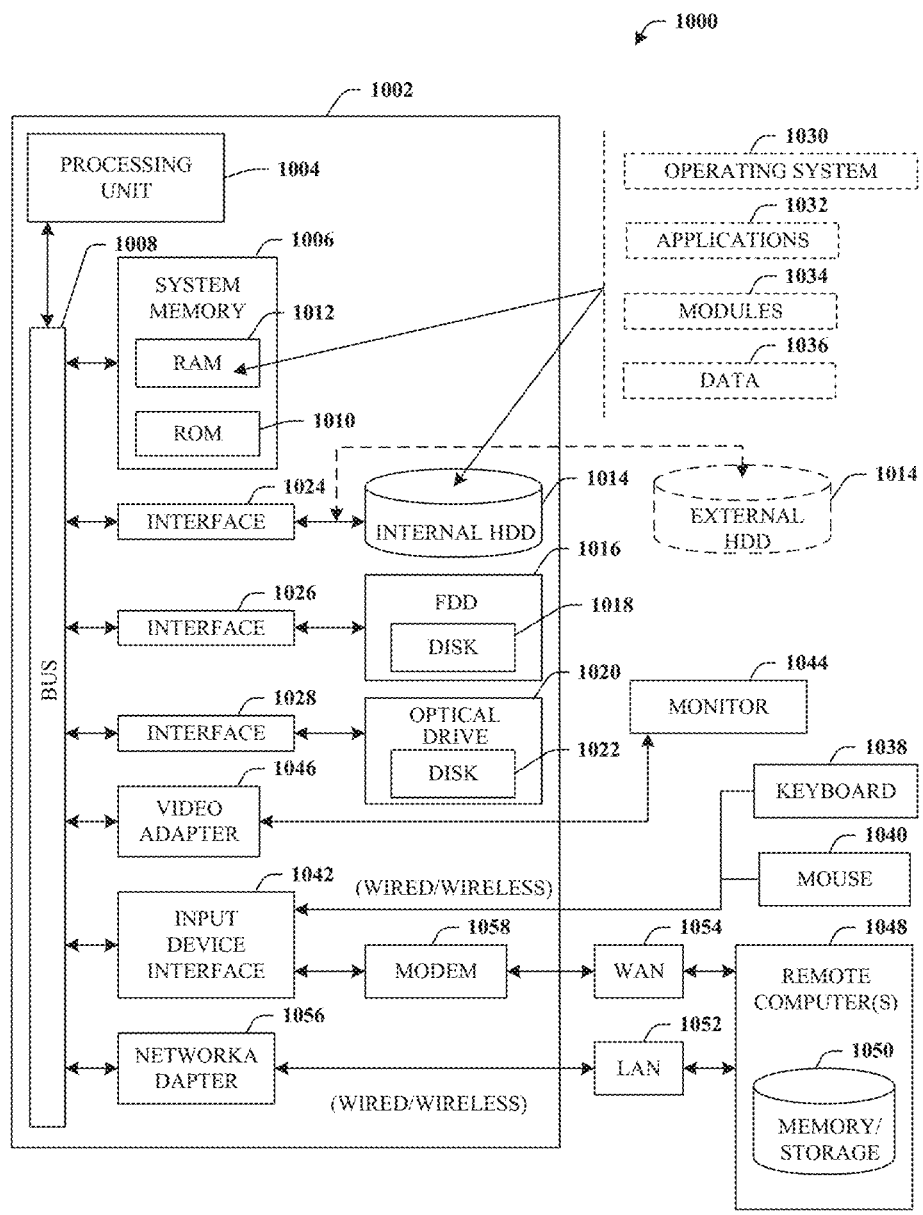
FIG. 10 is an illustration of an example computing environment where one or more of the provisions set forth herein are implemented, according to one or more embodiments.

Referring now to FIG. 10, there is illustrated a block diagram of a computer operable to execute the disclosed architecture. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules or components depicted relative to the computer 1002, or portions thereof, can be stored in the remote memory/storage device 1050. The network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 11:
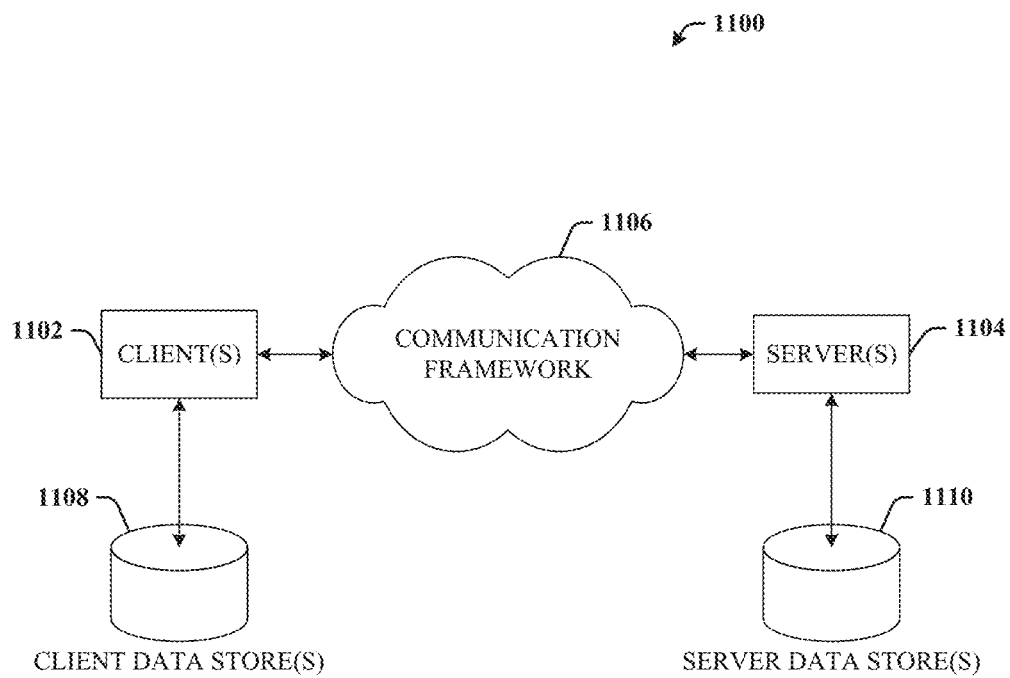
FIG. 11 is an illustration of an example computing environment where one or more of the provisions set forth herein are implemented, according to one or more embodiments.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices).

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102. Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
a processor coupled to a memory that stores instructions that when executed by the processor cause the processor to:
receive an application update comprising an operational status of an application, wherein the application comprises at least one automated monitoring validator that determines operational status and a healthcheck hub that validates a user permission;
select a user account from a set of user accounts based on user subscription data and the application; and
convey, over an internet protocol network, the application update to a client device associated with the user account, based at least on the validated user permission, wherein the conveyance has a dual track of an auto-monitoring mode and a manual validation mode, and a user can intervene outside of a subscribed automatic validation by sending a validation request to the healthcheck hub in the manual validation mode, and the healthcheck hub validates the user permission based on the user intervention.

2. The system of claim 1, further comprising instructions that cause the processor to delay conveyance, after an application impairment is confirmed, of the application update for a configurable time.

3. The system of claim 1, further comprising instructions that cause the processor to:
log received updates;
determine a behavior pattern based on the updates; and compute a risk of inoperability or impairment based on the behavior pattern.

4. The system of claim 1, further comprising instructions that cause the processor to
determine that the application is inoperable after not receiving the application update for a predetermined time period.

5. The system of claim 1 further comprising instructions that cause the processor to receive the application update from an automated monitoring validator associated with the application that indicates success, impaired, or failure with respect to an application component.

6. The system of claim 5, wherein the automated monitoring validator forms at least part of a channel and is configurable by way of the channel.

7. The system of claim 1, further comprising instructions that cause the processor to ping the application and receive an application update in response to the ping.

8. The system of claim 1, further comprising instructions that cause the processor to notify a user associated with a user account based on specified interest of the user.

9. The system of claim 1, wherein the user subscription data indicates a channel that the user is subscribed to, wherein the application is associated with the channel.

10. The system of claim 9, wherein the channel is based on job duties associated with the user account.

11. A method, comprising:
executing, by a processor, instructions that cause the processor to perform operations comprising:
receiving an application status update comprising an operational status of an application, wherein the application comprises at least one automated monitoring validator that determines operational status, and a healthcheck hub that validates a user permission;
selecting a set of users to send the application status update based on user account data associated with the set of users and an application type; and
transmitting, over an internet protocol, the application status update to a set of client devices associated with the set of users, based at least on the validated user permission, wherein the transmission has a dual track of an automonitoring mode and a manual validation mode, and a user can intervene outside of a subscribed automatic validation by sending a validation request to the healthcheck hub in the manual validation mode, and the healthcheck hub validates the user permission based on the user intervention.

12. The method of claim 11, the operations further comprising delaying transmitting, after an application impairment is confirmed, the application for a configurable time.

13. The method of claim 12, the operations further comprising:
logging received updates;
determining a behavior pattern based on the updates;
computing a risk of inoperability or impairment based on the behavior pattern; and
setting the application status based on the risk and one or more thresholds.

14. The method of claim 11, the operations further comprising determining that the application is inoperable after not receiving the application update for a predetermined period of time.

15. The method of claim 11, the operations further comprising receiving the application update from the automated monitoring validator associated with the application that indicates success, impaired, or failure with respect to an application component.

16. The method of claim 11, the operations further comprising pinging the application and receiving an application update in response to the ping.

17. The method of claim 11, the operations further comprising transmitting the application update comprising data indicating a period of time the application status will be valid.

18. A computer-readable storage device configured to store instructions, that when executed by a processor perform operations, comprising:
pinging an application;
determining application status based on response of the application to the pinging,
wherein determining application status also includes validating a user permission for the application;
selecting a set of users to send an application status based on user account data associated with the set of users, and the validated user permission;
delaying action for a predetermined period of time when the application status is impaired or inoperable to allow the status to potentially change; and
transmitting, over an internet protocol, the application status to a set of client devices associated with the set of users, wherein the transmission has a dual track of an automonitoring mode and a manual validation mode, and a user can intervene outside of a subscribed automatic validation by sending a validation request in the manual validation mode, and the validated user permission is based on the user intervention.

19. The computer-readable storage device of claim 18, further comprising setting the application status update as inoperable when the application status update is not received within a predetermined time.

20. The computer-readable storage device of claim 18, further comprising:
determining a behavior pattern based on responses of the application to the pinging;
computing a risk of inoperability or impairment based on the behavior pattern; and
setting the application status based on the risk as compared to at least one threshold.

* * * * *